United States Patent

[11] 3,584,857

| | | |
|---|---|---|
| [72] | Inventor | Gary L. Hipsher<br>Logansport, Ind. |
| [21] | Appl. No. | 827,718 |
| [22] | Filed | May 26, 1969 |
| [45] | Patented | June 15, 1971 |
| [73] | Assignee | The general Tire & Rubber Company |

[54] FLANGED-END BUSHING
8 Claims, 5 Drawing Figs.

| | | |
|---|---|---|
| [52] | U.S. Cl. | 267/57.1 |
| [51] | Int. Cl. | F16f 1/38 |
| [50] | Field of Search | 267/57.1, 57.1 A2 |

[56] References Cited
UNITED STATES PATENTS

| | | | |
|---|---|---|---|
| 2,563,090 | 8/1951 | Woolson et al. | 267/57.1 |
| 3,147,964 | 9/1964 | Wolf | 267/57.1(A) |

*Primary Examiner*—James B. Marbert
*Attorneys*—Frank C. Rote, Jr. and Harry F. Pepper, Jr.

ABSTRACT: A high axial rate resilient bushing comprising an annular molded rubber insert radially compressed between an inner rigid sleeve and an outer sleeve having flanges at either end can be press fitted into an automobile frame even though the diameter of the flanges is greater than that of the opening in the frame. This is achieved through the use of a two-piece telescoping outer sleeve each piece forming one of said flanges. The bushing can be used, for example, in the shackle spring of an automobile.

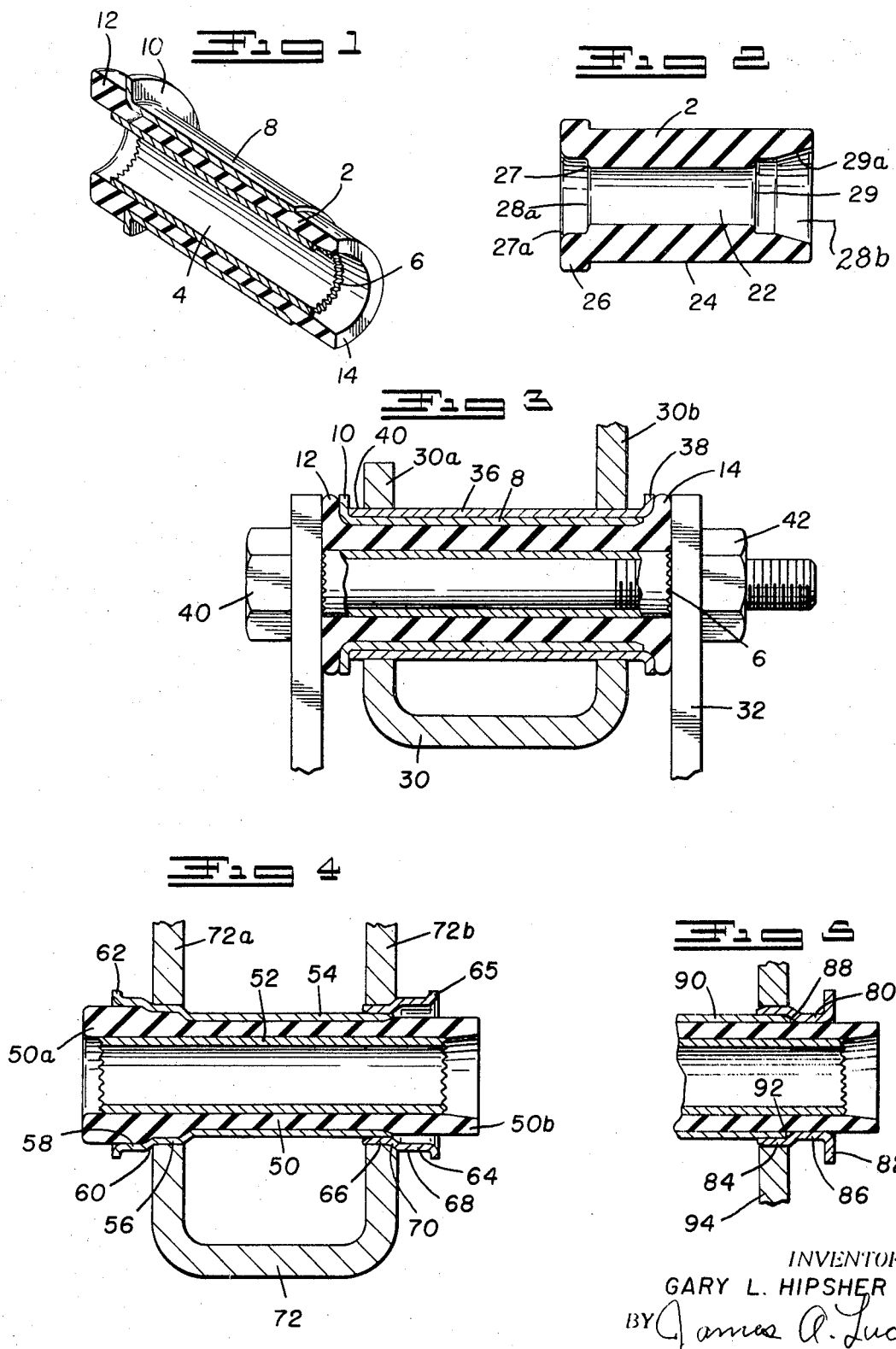

FLANGED-END BUSHING

BACKGROUND OF THE INVENTION

Elastomeric bushings of the general type described herein have been used for many years to provide a flexible connection between two relatively movable parts of a machine, vehicle or the like. At first, these bushings were made by placing an uncured rubber compound between a pair of metal sleeves and thereafter vulcanizing the rubber to form a permanent bond with both of the sleeves. This type of bushing was later improved by first molding and curing the elastomeric insert and thereafter assembling it between two sleeves. The insert as molded would have a wall thickness greater than the space between the two sleeves thus requiring the insert to be radially compressed during assembly. This radial compression would force the insert to undergo axial elongation and would cause the insert to frictionally adhere to the contacting surfaces of the sleeves. With this type of construction, the outer sleeve can be rotated in an arc of about 100° with respect to the inner sleeve without slippage between the sleeves and the rubber.

There are several ways of designing a bushing and compounding the rubber to give specified spring rates in the axial, radial and torsional directions. For example, increasing the durometer or hardness of the rubber will generally make it stiffer, thereby raising the spring rate of the bushing in all directions. Further, the judicious use of voids, as described in Wolf U.S. Pat. No. 3,147,964 owned by the assignee of the present invention, provides a means for producing a bushing with a spring rate in one radial plane that differs from that in the other radial plane. Another way of increasing the stiffness and the spring rate of the bushing in the axial direction is to use an outer sleeve, having radially outwardly extending flanges at either end thereof, using an insert which, during assembly of the bushing, extends axially beyond the flanges of the outer sleeve, and thereafter snubbing or compressing the ends of the insert against these flanges. This presents certain assembly problems particularly where the bushing is to be press-fitted into another part. The presence of the flanges at either end of the bushing precludes such an installation.

BRIEF DESCRIPTION OF THE INVENTION

It is an object of the present invention to obviate the foregoing difficulties attendant with the use of a bushing having flanges at both ends.

Another object is a bushing having a controlled axial rate obtained by snubbing the ends of the elastomeric insert up against the flanges at either end of the bushing, wherein the bushing can be press fitted into place.

These and other objects are accomplished in the foregoing manner with reference to the drawings in which FIG. 1 is a perspective view partially cut away of an assembled bushing before installation;

FIG. 2 is a cross section of an elastomeric insert as molded, prior to assembly into a bushing;

FIG. 3 is a cross-sectional elevation showing a bushing installed into place in the shackle of an automotive vehicle;

FIG. 4 is another embodiment of the bushing, shown in cross section, assembled and partially installed; and FIG. 5 is a partial cross section of yet another embodiment of the present invention.

DETAILED DESCRIPTION OF THE INVENTION

This invention relates to an annular bushing comprising an elastomeric insert radially compressed between an inner and an outer concentric sleeve, the inner sleeve being cylindrical and the outer sleeve having a radially extending flange at each end thereof. The insert extends axially beyond the ends of the flange to be snubbed up against the respective flange when the bushing is installed. The improvement resides in the use of an outer sleeve having a first bushing sleeve in contact with the insert and having a radially outwardly extending flange at one end against which the first end of the axially extending insert is snubbed during installation and a flanged sleeve cap telescopically engaged with the bushing sleeve and having a flange against which the portion of the insert extending from the second end of the bushing is snubbed.

Referring now to FIG. 1 there is shown a perspective cutaway view of an assembled bushing prior to its installation, as for example, a shackle bushing in a car. The bushing consists of an elastomeric insert 2 radially compressed between an inner sleeve 4 having serrations 6 at either end thereof and an outer sleeve 8 with a flange 10 at one end. One end 12 of the insert extends axially beyond the flange 10 while the other end 14 extends axially beyond the other end of the inner and outer sleeves.

FIG. 2 is a cross section of the insert used in the assembly of the bushing shown in FIG. 1. As molded, the bushing 2 has an annular passageway 22 extending therethrough, the diameter of the passageway being less than the outer diameter of the inner sleeve 4. The outer surface 24 of the bushing defines a surface of revolution having an outer diameter greater than the inner diameter of the outer sleeve 8. The insert has a molded flange 26 at one end. The passageway 22 is composed of an intermediate portion of uniform diameter and two end portions 28a, 28b of larger diameter than, and joined to, the intermediate portion by shoulders 27, 29. Each end of each passageway is relieved as by a bevelled or curved surface 27a, 29a. When the insert is assembled between the inner and outer sleeves, it undergoes a large amount of radial compression, which causes the insert to axially elongate and to extend out beyond the ends of the sleeves. When the bushing is assembled, the portion of the passageway between the two shoulders 27, 29 is substantially the same length as the outer sleeve.

The radial force of the insert under compression is sufficient to prevent disassembly of the bushing, even when high axial, radial and torsional loads are applied thereto. However, to further strengthen the bushing and to permit it to be used at high loads, a cement is often used to bond the insert to the two sleeves. A typical cement is that described in U.S. Pat. No. 3,387,839 issued on June 11, 1968 and assigned to the assignee of the present invention.

There are several types of machines that can be used to assemble bushings of the aforegoing description. Most of them utilize a tapered mandrel, a sleeve, and a suitable lubricant along with hydraulic pressure to assemble the rubber insert into the outer sleeve and the inner sleeve into the insert.

FIG. 3 shows a typical installation of a bushing in the rear leaf spring of an automobile. In this installation, the bushing accommodates relative movement between the frame 30 of the vehicle and the shackle arms 32 which are connected to the rear of the leaf springs. The frame 30 is generally cannel shaped. The two parallel sides 30a, 30b of the frame are drilled or otherwise provided with holes through which the bushing subassembly of FIG. 1 is inserted. A sleeve cap 36 having a flange at one end is telescopically fitted over the bushing sleeve 8 until the end 40 of the sleeve contacts flange 10. The holes in the frame are made sufficiently large to permit the sleeve cap to be slipped over the bushing sleeve. The holes are small enough, however, to form a press-fit between the sleeve cap and the frame. The two arms 32 of the shackle are then placed at the two ends of the bushing and bolt 40 is slipped through the arms and inner sleeve. A nut 42 is threaded onto the bolt and is drawn up tight to draw the shackle arms up against the serrated ends 6 of the inner sleeve to prevent relative movement between the arms and the inner sleeve. At the same time the extended ends 12, 14 of the insert are flared out against the flanges 10, 38 of the outer sleeve and the sleeve cap. When compressed, these extended ends tend to flare outwardly rather than inwardly primarily because of the curved and bevelled surfaces 27a, 29a. The axial length of the outer sleeve is less than that of the inner sleeve to accommodate the rubber that is forced outwardly. The bushing as assembled permits relative radial, torsional and axial movement between the frame 30 and shackle arms 32. The axial movement is limited by the amount of rubber compressed between the shackle arms and the flange. In FIG. 3, the axial distance between the flanges 10, 38 is determined by the length of the sleeve cap 36.

FIG. 4 shows another embodiment wherein the outer sleeve and sleeve cap both have a step-shoulder design and wherein the frame rides on one of the steps in abutment with a shoulder. As before, a rubber insert 50 is radially compressed between an inner sleeve 52 and an outer sleeve 54. The two ends 50a, 50b of the insert project radially beyond the ends of the sleeves. The outer sleeve 54 is provided with a pair of steps 56, 58 joined by a shoulder 60. It also contains a flange 62 at one end. A short end cap 64 is also provided with a pair of steps 66, 68 with an intermediate shoulder 70. The outer diameter of the first step 56 of the sleeve corresponds in size with one of the holes through the first side 71a of frame 72 while the diameter of the corresponding step 66 of the end cap 64 conforms to the hole through the second side 72b of the channel member. Holes in 72a and 72b are normally equal in diameter. As the bushing is installed through the frame, its axial movement is limited by shoulder 60 which contacts the frame 72a and which serves as a positive stop to register the location of the bushing with respect to the frame. The flanged end cap 64 is then placed into position around the outer sleeve 54 and is hammered or otherwise press fitted around sleeve 54 until shoulder 70 contacts side 72b of the frame. As before, a bolt or other securing means is used to snub the extended ends of the insert against the flanges 62, 65 and to hold the entire assembly in place.

Still another embodiment is shown in FIG. 5 wherein an end cap 80 is used with a reverse step shoulder. The end cap has a radially outwardly extending flange 82 at one end and a sleeve 84 at the other end adapted to telescope over the end of the bushing sleeve 90. Between the flange 82 and sleeve 84 is an intermediate portion 86 of smaller diameter than sleeve 84. A shoulder 88 is formed between the sleeve 84 and intermediate portion 86. This shoulder serves as a means for limiting the extent of the axial movement of the end cap 80 with respect to bushing sleeve 90. The end cap is shown press fitted through a hole in a suitable structural member 94 such as a frame of the type previously described.

The type of bushing as herein described can be used in applications other than the shackles of a leaf spring. For example, it can be used in applications such as strut rod bushings and others wherein design considerations dictate that the bushing must be press fitted through a frame opening and where a double-flanged bushing is necessary to provide controlled axial rates or to provide fail-safe operation.

The dimensional tolerances between the outer sleeve and the sleeve cap should be sufficient to permit easy assembly of the bushing without deformation, scoring or crimping of the component parts. Obviously, the part must be capable of being press fitted or otherwise assembled into the appropriate structural member.

The various dimensions of the bushing are subject to wide variations. For example, the thickness of the rubber, and the relative dimensions of the inner and outer sleeves are all dictated by design considerations that are unrelated to the subject matter of the present invention. As shown and described, the bushing is circular. The present invention is not limited, however, to circular bushings, but instead can include oval bushings and the like.

The inner and outer sleeves are preferably made of metal. However, rigid plastic can also be used. The insert can be formulated from any suitable material such as natural rubber, neoprene, SBR, butadiene acylonitrile copolymers and the like appropriately blended with carbon black and extender oils.

In addition to the variations described, there are many other changes that can be made in the design and construction of the bushing of the present invention without departing from the novel concept delimited by the following claims in which I claim:

1. In the combination of a pair of spring shackle arms, a vehicle frame member having an annular passageway therethrough and a resilient bushing interconnecting said shackle arms and said frame member, said bushing comprising a molded elastomeric insert, an inner cylindrical sleeve, and an outer sleeve concentric with and shorter than the inner sleeve and having a radially outwardly extending flange at both ends thereof, said insert radially compressed between the sleeves and extended axially beyond the ends of the inner sleeve before assembly of the bushing between said shackle arms and snubbed against the outer flanges after assembly, the improvement wherein said outer sleeve is composed of a first tubular flanged part in contact with the outer surface of the insert and positioned through said annular passageway in said frame member, and a second part press fitted around the first tubular part and in said annular passageway in said frame member, wherein the outer diameter of the flanges on each of said first and second parts is larger than the diameter of the annular passageway through said frame member and wherein said flanges are on either side of the frame member.

2. The combination of claim 1 wherein the axial length of the second flanged part is substantially the same length as that of the first flanged part.

3. The combination of claim 1 wherein the first flanged part has a shoulder which serves to register the bushing with respect to the annular passageway in said frame member and the second flanged part has a shoulder which serves to register it with respect to said frame member.

4. In an elastomeric bushing having a tubular elastomeric insert radially compressed between inner and outer sleeve members, said outer sleeve member having a radially outwardly extending, annular flange at each end thereof and said elastomeric insert having end portions extending axially beyond the ends of both of said inner and outer sleeve members such that said end portions can be snubbed against said flanges of said outer sleeve member, the improvement wherein said outer sleeve member comprises:
A. a tubular bushing sleeve having a radially outwardly extending, annular flange at one end thereof, and
B. a sleeve cap
 1. having a radially outwardly extending, annular flange at one end thereof, and
 2. telescopically engaging said bushing sleeve.

5. The bushing defined in claim 4 further characterized in that said sleeve cap is substantially the same axial length as said bushing sleeve.

6. The bushing as defined in claim 4 further characterized in that said bushing sleeve is provided with a shoulder axially spaced from said annular flange thereof adapted to limit the amount of axial passage of said sleeve through an opening having a diameter less than the diameter of said annular flange.

7. The bushing as defined in claim 4 further characterized in that said sleeve cap is provided with a shoulder axially spaced from said annular flange thereof adapted to limit the amount of axial passage of said sleeve through an opening having a diameter less than the diameter of said annular flange.

8. The bushing as defined in claim 6 further characterized in that said sleeve cap comprises a shoulder axially spaced from said annular flange thereof adapted to limit the amount of axial passage of said sleeve through an opening having a diameter less than the diameter of said annular flange.